United States Patent

Guglietti

[15] 3,638,922
[45] Feb. 1, 1972

[54] PROPORTIONATING BLENDER

[72] Inventor: Henry G. Guglietti, Fitchburg, Mass.

[73] Assignee: Plastics Materials Systems, Inc., Fitchburg, Mass.

[22] Filed: Nov. 13, 1968

[21] Appl. No.: 775,265

[52] U.S. Cl..................................259/154, 259/8, 259/17
[51] Int. Cl.........................................................B28c 7/04
[58] Field of Search..............259/17.8, 154, 149; 18/12 SH; 137/88, 98; 198/220 A; 222/57, 129

[56] References Cited

UNITED STATES PATENTS

| | | | |
|---|---|---|---|
| 2,608,394 | 8/1952 | Williamson | 259/154 |
| 2,727,733 | 12/1955 | Carswell | 259/154 |
| 2,863,651 | 12/1958 | McBride | 259/154 |
| 3,148,412 | 9/1964 | Spreedwers | 18/12 |
| 3,312,374 | 4/1967 | Whitlock | 259/17 X |
| 3,378,235 | 4/1968 | Udy et al. | 259/8 |

*Primary Examiner*—James Kee Chi
*Attorney*—Thomas C. Stover

[57] ABSTRACT

A blender is provided for proportionating and mixing fluid-particulate materials such as thermoplastic particles, wherein streams of material are dispensed from a plurality of hoppers to a plurality of vibrating channels, the channels converging to a final vibrating channel which blends all the materials.

11 Claims, 2 Drawing Figures

PATENTED FEB 1 1972    3,638,922

INVENTOR
HENRY G. GUGLIETTI
BY Thomas C. Strough

ATTORNEY

PROPORTIONATING BLENDER

This invention relates to a blender for fluid materials particularly a proportionating blender for fluid materials.

Mixing and blending of materials in industrial processes has heretofore been conducted in a variety of ways. Thus, for example, mixing particulate materials including powder has been accomplished in a tumbler or revolving chamber, in a chamber agitated by a helical auger, a turntable which sweeps under a stationary bar, and the like.

The above blending systems have all been complex, having a number of moving parts, requiring frequent maintenance and repair resulting in considerable downtime. These blenders have other shortcomings. Some such as the tumbler or auger mix only in a batch operation; the mix components must be proportioned in a previous step. Other blenders do not continuously blend or feed the material so blended onto the next process step. For example, materials mixed in a tumbler must be removed batchwise to a subsequent step such as an extruder. A simplified blender which overcomes the above shortcomings has heretofore not been available.

There has now been developed a blender which proportionates fluid materials while blending them. The invention further provides an apparatus which continuously proportionates and blends fluid materials at high throughput rates. There is further provided a proportionating blender having practically no moving parts.

Broadly the present invention provides a proportionating blender comprising a plurality of feed sources for the materials, each feed source having a discharge port in the lower portion thereof, a plurality of substantially horizontal feed channels below the ports, the channels in converging array so that the material in the plurality of channels can be conducted to a lesser number of channels for blending thereof and means for vibrating the feed channels for conveying the materials from the feed sources to the collecting channel.

The invention will become more apparent from the following detailed specification and drawings in which.

Figure 1:
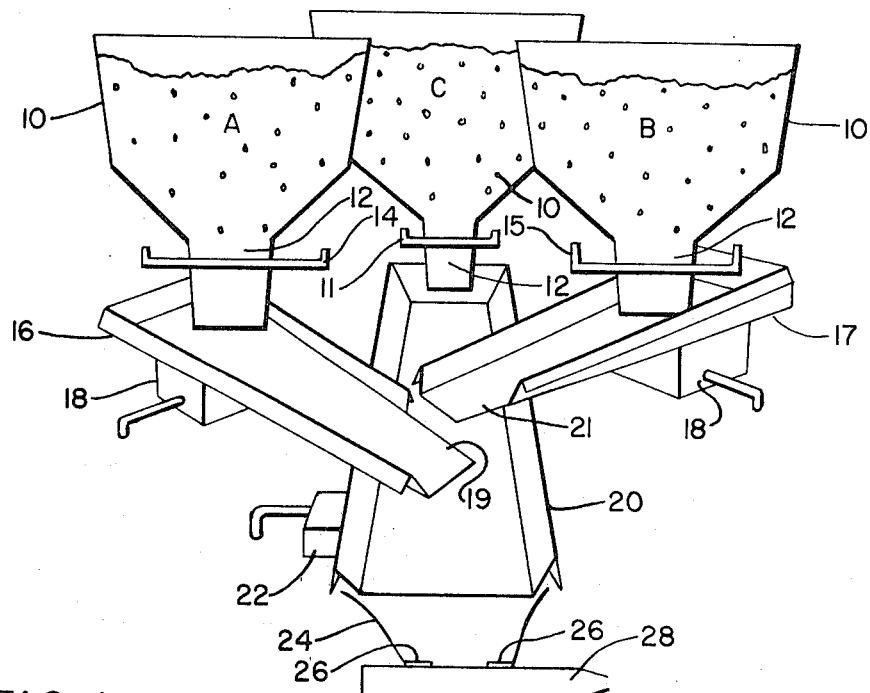
FIG. 1 is a schematic elevation view showing the proportionating blender embodying the invention.

Referring now to the drawings. Hoppers 10 holding respectively different particulate materials A, B, and C, discharge such materials through discharge ports 12 as illustrated in FIG. 1. Feed channels 16, 17 and 20 are positioned below discharge ports 12 for receiving materials A, B, and C discharged therefrom. Vibrating means 18, including an electromagnetic oscillator and a variable rheostat, vibrate channels 16 and 17 thus conveying materials A and B to collection channel 20 for mixing thereof. Vibrating means 22, including an electromagnetic oscillator and a variable rheostat, vibrates channel 20, continuously blending materials A and B while conveying the materials to the next processing step. The blended materials flow into hopper 24 and thence to extruder 28 as shown in FIG. 1. Pressure-sensitive switches 26 stop the blending apparatus if the hopper 24 fills to an undesirable level as discussed hereinafter.

Figure 2:
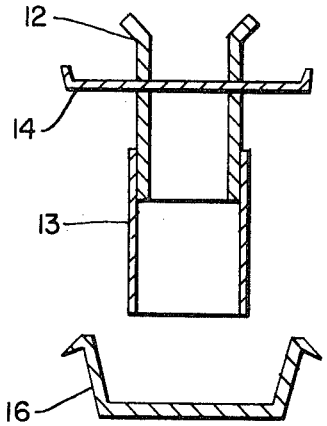
FIG. 2 is a sectional elevation view of a discharge port modification of the blender embodied in FIG. 1.

Discharge-port gates 11, 14 and 15 control the gravity flow rates and blending ratio of materials A, B and C. In another embodiment, discharge port 12 is provided with a sleeve 13 as shown in FIG. 2, to raise or lower the effective distance between the discharge port 12 and the feed channel 16, which serves to increase or decrease the flow rates of materials A and B from the hoppers 10. Adjusting the vibration frequency of the vibration means 18 or 22 also serves to control the respective flow rates and blending ratio of the materials A, B and C.

Advantageously, cutouts, such as cutout 19, in channel 16 and cutout 21 in channel 17, are provided to assist the uniform lateral distribution of flowing materials across collection channel 20 below.

Accordingly there is provided a blender wherein the ratio of the mix components can be maintained or readily varied. Moreover the apparatus, though of simple construction, provides continuous blending at a desired proportion at high throughput rates. Because of the blender's simplified construction of practically no moving parts, it is highly economical to purchase and maintenance is nearly nonexistent.

In the present invention, blending of materials takes place in two ways; the vibration of a collection channel thoroughly mixes and blends all materials contained therein while moving said materials forward and the ensuing fall of the materials off the channel end further mixes and blends the materials.

The present invention contemplates a plurality of feed sources, e.g., designated hoppers, silos, feed chambers and the like. There can be one feed source divided into two or more compartments but typically there are two, three or more feed sources, e.g., hoppers, which house the different materials to be blended. The feed source can be at atmospheric or elevated pressures to assist material discharge therefrom. The materials contemplated herein are flowable materials such as powders, particles and the like, particularly plastic material including polypropylene particles. All of which material is referred to herein as fluid-particulate material.

Each feed source has one or more discharge ports advantageously located in the lower portion thereof for gravity material discharge. The discharge ports need not be located in the lower portion of the feed sources, e.g., hoppers where the material is flowable enough, e.g., where the particulate material is aerated, the feed source is under pressure or the like. The ports can have construction means such as valves for regulation of material discharge flow and blend proportions. Additionally the ports can be retractable and extendable to change the flow rates of materials passing therethrough.

The feed and collection channels can be of varying shapes, sizes and stiff materials suitable to the skilled practitioner. Preferably the channels are relatively flat, U-shaped, oblong trays of metal or stiff plastic. However, the channels can be other suitable shapes, e.g., tubular in portion, flat and open in portion, V-shaped, W-shaped, which examples are but a sample of the channel shapes encompassed in the present invention.

In number, the feed channels can be one per discharge port or less, e.g., where two ports discharge onto the same feed channel. The feed channels can discharge directly onto one collection channel or the feed channels can discharge to a lesser number of collection channels which progressively discharge to a final feed or collection channel. Advantageously, the feed channels are positioned in converging array to overlap in a vertical plane above a collection channel. In addition a discharge port can discharge directly to a collection channel as shown for example in FIG. 1.

The feed channels and collection channels, if desired, are vibrated by mechanical, electrical or any other suitable vibrating means. Examples of vibrating means are an electric motor with an oscillating shaft, an electric coil, a spring-wound oscillator and the like. Preferred is an electric coil and variable rheostat assembly which applies an alternating electromagnet field to the channels causing vibration thereof. The vibration rate is adjusted by varying the rheostat setting which rate controls the material flow rate thereover. With such vibrating means, the proportionating blender of the invention has, in practical effect, no moving parts.

The feed channels are placed in a nearly horizontal position with a slight slope toward the terminal ends thereof. The slope of the channels can be increased and decreased to suit the application thereof. Change of channel slope provides a further means of control of material flow thereover.

The proportionating blender of the invention can be united in concert with one or more other such blenders which blend several material streams into a lesser number of final blended streams. The proportionating blender of the invention can also be linked to various other processes; an extruder, a mill, a liquid-blending stage, a devolatizer blow molding, injection molding, are but a few examples.

The blender of the present invention is desirably employed in combination with a pressure-sensitive switch for effective batch operation. When, for example, the blender is operated to discharge to an extruder at a greater rate than the extruder can accept, it is desirable to permit only a small accumulation of blend in a hopper above the extruder and thereupon to halt the operation of the blender. This is because a large accumulation of blend in, for example, a hopper mounted on an extruder will be subject to the vibration of the extruder, or other apparatus. Such vibration after an extended period tends to cause separation or unmixing of the blend with fine particles, e.g., colorant, sifting toward the hopper bottom. Accordingly, a pressure switch, e.g., paddle switch, placed in the extruder hopper, is set to stop the blender of the present invention after a predetermined small accumulation of blend in the hopper, and to reactivate the blender when the hopper blend descends to a minimum level in the hopper as it flows into the extruder. In this manner, the blend is thus batchwise delivered to the extruder on other processing stage and maintained in a highly mixed state and unmixing of the blend is avoided. Although the pressure-sensitive switch referred to above is preferred, any other quantity-sensing switch desired can be employed.

The following example is intended only as an illustration of the present invention and should not be construed in limitation thereof.

EXAMPLE I

Polyethyene pellets, reground polyethyene material and colorant particles ($TiO_2$ in polyethylene) were blended in a three-hopper proportionating blender such as illustrated in FIG. 1. The hoppers included a large central prime-feed hopper 18"×18"×15" in size and two auxiliary hoppers each 18"×9×15" in size. Into the large hopper was added 100 lbs. polyethylene pellets. About 25 pounds of polyethylene reground material were added to one of the auxiliary hoppers, while 5 pounds of the colorant material were added to the remaining auxiliary hopper.

Situated below the three hoppers were three converging channels, each with a vibrator such as shown in FIG. 1.

With the terminal ends of the discharge-port sleeves (FIG. 2) situated 3/16 inch above the floors of their associated channels, the channel vibrators were turned on to 5 cycles per second (c.p.s.) and the discharge ports were opened to form a 2-inch-diameter orifice each to provide a throughput rate from the lowest or collection channel of 100 pounds per hour of blended material. The discharge port sleeves were then retracted from the channels in stages of about 3/16 inch and the channel vibration frequency correspondingly increased in stages of about 10 c.p.s. so that the throughput rate increased in steps of 500 pounds per hour until with the ends of the sleeves position 1½ inches above the respective channel floors and the channel vibrators set at 60, the throughput rate of the blended materials reached 3,000 pounds per hour.

At each of the above throughput rates, 100 to 3,000 pounds per hour, whether the blender was run on a continuous or interrupted basis, thorough, uniform blending of the three feed materials was obtained. In addition, the accuracy of the blend proportions was found consistently to exceed ±1 gram deviation per 4,767 grams of blend. That is, with the blender set to add colorant to the polyethylene material at the rate of 227 grams colorant for every 4,540 grams polyethylene, the ratio of colorant to polyethylene was maintained between 226 to 228 grams colorant per 4,540 grams polyethylene.

It was found, moreover, that the proportions of the blend constituents were readily changed by changing the distance between sleeve end and channel floor of one or more discharge ports or by changing the frequency of one or more of the channel vibrators or by changing the size of one or more of the discharge port openings. By the above means, for example, the colorant proportion can be adjusted until the final blend reaches the desired color.

What is claimed is:

1. A proportionating blender for mixing fluid-particulate materials comprising a plurality of feed sources for said materials, each feed source having a discharge port in the lower portion thereof, a plurality of substantially horizontal feed channels below said ports for receiving said materials, a collection channel situated below said feed channels, said feed channels positioned in converging array to overlap in a vertical plane above said collection channel so that said material in said feed channels can be conducted to said collection channel for blending thereof, means for opening said ports and means for vibrating all of said channels for conveying said materials from said feed source to said channels for blending thereof.

2. The blender of claim 1 wherein each feed source has a plurality discharge ports discharging to at least one feed channel.

3. The blender of claim 1 wherein said ports have adjustable openings to vary the flow of said materials therethrough.

4. The blender of claim 1 wherein means are provided for extending and retracting each discharge port with respect to the floor of the associated channel to control the flow rate of material along said channel.

5. The blender of claim 1 wherein means for varying the vibration frequency of each channel is provided.

6. The blender of claim 1 wherein each vibrating means comprises an electromagnetic oscillator.

7. The blender of claim 1 wherein each vibrating mans comprises a variable rheostat.

8. The blender of claim 1 wherein said feed sources comprise three hoppers communicating with three feed channels leading to a collection channel.

9. The blender of claim 1 wherein the terminal end of said collection channel communicates with an extruder.

10. The blender of claim 1 in combination with a collection chamber positioned to receive the blended material as it issues from the collection channel, a pressure-sensitive on-off switch connected to said blender, said switch being positioned within said collection chamber for halting the blender as said collection chamber fills and reactivating said blender as said collection chamber empties.

11. The blender of claim 1 wherein a feed-source discharge port is positioned directly over said collection channel to feed materials thereto.

* * * * *